US006498466B1

(12) United States Patent
Edwards

(10) Patent No.: US 6,498,466 B1
(45) Date of Patent: Dec. 24, 2002

(54) CANCELLATION OF SLOPE COMPENSATION EFFECT ON CURRENT LIMIT

(75) Inventor: Karl Edwards, San Jose, CA (US)

(73) Assignee: Linear Technology Corp., Milpitas, CA (US)

( * ) Notice: Subject to any disclaimer, the term of this patent is extended or adjusted under 35 U.S.C. 154(b) by 0 days.

(21) Appl. No.: 09/576,517

(22) Filed: May 23, 2000

(51) Int. Cl.⁷ .......................... G05F 1/40; H02M 3/335
(52) U.S. Cl. ..................................... 323/282; 363/21.17
(58) Field of Search ................................ 323/282, 283, 323/284, 285, 286, 288, 290; 363/26, 56, 74, 78

(56) References Cited

U.S. PATENT DOCUMENTS 4,975,820 A * 12/1990 Szepesi ...................... 323/282
5,305,192 A * 4/1994 Bonte et al. ................ 323/285
5,717,322 A * 2/1998 Hawkes et al. ............. 323/283
6,222,356 B1 * 4/2001 Taghizadeh-Kaschani .. 323/288

* cited by examiner

Primary Examiner—Rajnikant B. Patel
(74) Attorney, Agent, or Firm—Fish & Neave; Michael E. Shanahan; George L. Kanabe

(57) ABSTRACT

A current-mode switching regulator that maintains a substantially constant maximum current limit over a virtually full range of duty cycles is provided. The regulator has a control circuit that includes a buffer circuit, an adjustable voltage clamp circuit, and a slope compensation circuit. The buffer circuit isolates a control signal from capacitive loading associated with control circuit. The threshold level of the adjustable voltage clamp circuit varies with respect to the amount of slope compensation provided to the voltage regulator. This allows a control voltage to increase as slope compensation increases so that a substantially constant maximum current limit is maintained.

35 Claims, 6 Drawing Sheets

CANCELLATION OF SLOPE COMPENSATION EFFECT ON CURRENT LIMIT

BACKGROUND OF THE INVENTION

The present invention relates to switching regulator circuits. More particularly, the present invention relates to circuits and methods for offsetting the current reduction effects caused by the use of slope compensation in switching regulator circuits.

The purpose of a voltage regulator is to provide a predetermined and substantially constant output voltage to a load from a voltage source which may be poorly-specified or fluctuating. Two types of regulators are commonly used to provide this function, a linear regulator and a switching regulator. In a typical linear regulator, the output voltage is regulated by controlling the flow of current through a pass element from the voltage source to the load.

In switching voltage regulators, however, the flow of current from the voltage source to the load is not steady, but is rather in the form of discrete current pulses. To create the discrete current pulses, switching regulators usually employ a switch (such as a power transistor) that is coupled either in series or parallel with the load. The current pulses are then converted into a steady load current with an inductive storage element.

By controlling the duty cycle of this switch (i.e., the percentage of time that the switch is ON relative to the total period of the switching cycle), the switching voltage regulator can regulate the load voltage. In current-mode switching voltage regulators (i.e., a switching regulator that is controlled by a current-derived signal in the regulator) there is an inherent instability when the duty cycle exceeds 50% (i.e., when the switch is ON for more than 50% of a given switching period). Stability is often maintained in such current-mode switching regulators by adjusting the current-derived signal used to control the regulator with a slope compensation signal.

One method of producing such a slope compensation signal is to use a portion of an oscillator signal as the compensation signal. The oscillator signal may be, for example, a ramp signal that is used to generate a clock signal that controls the switching of the regulator. The slope compensation signal can be applied by either adding the ramp signal to the current-derived signal, or by subtracting it from a control signal.

An example of a typical prior art current-mode switching regulator 100 utilizing slope compensation is shown in FIG. 1. Such a switching regulator is available from Linear Technology Corporation, Milpitas, Calif., for example, in model LT1376. Voltage regulator 100 generally comprises an output circuit 110 and a control circuit 130.

The voltage regulator of FIG. 1 operates as follows. A switch timing circuit 112 (which may be any circuit suitable for producing substantially in-phase ramp and clock signals) within control circuit 130 supplies a control signal SW ON that sets a latch 114. While latch 114 is set, it provides a signal to output circuit 110 that causes a switch 108 to turn ON and provide current from an input voltage source $V_{IN}$ to an output node 109. Latch 114 remains set until an output signal from a current comparator 122 causes latch 114 to reset. When reset, latch 114 turns switch 108 OFF so that current is no longer drawn from $V_{IN}$. Current comparator 122 determines when to reset latch 114 by comparing a signal ($V_L$) that is indicative of the current supplied to output circuit 110 with a current threshold value ($V_{TH}$) generated by an error amplifier 124 and a slope compensation signal $I_{SC}$ (discussed in more detail below).

The primary purpose of output circuit 110 is to provide current pulses as directed by control circuit 130 and to convert those current pulses into a substantially constant output current. Output circuit 110 includes power switch 108 coupled to $V_{IN}$ (through sensing a resistor 132) and a node 107, a catch diode 102 coupled from node 107 to ground, an inductor 104 coupled from node 107 to output node 109, and a capacitor 106 coupled from output node 109 to ground. Although switching element 108 is depicted as a bipolar junction transistor (BJT) in FIGS. 1 and 3, any other suitable switching element may be used if desired.

The operation of output circuit 110 can be divided into two periods. The first is when power switch 108 is ON, and the second is when power switch 108 is OFF. During the ON period, current passes from $V_{IN}$ through switch 108 and flows through inductor 104 to output node 109. During this period, catch diode 102 is reverse-biased. After power switch 108 turns OFF, however, inductor 104 still has current flowing through it. The former current path from $V_{IN}$ through switch 108 is now open-circuited, causing the voltage at node 107 to drop such that catch diode 102 becomes forward-biased and starts to conduct. This maintains a closed current loop through the load. When power switch 108 turns ON again, the voltage at node 107 rises such that catch diode 102 becomes reverse-biased and again turns OFF.

As shown in FIG. 1, error amplifier 124 senses the output voltage of regulator 100 via a feedback signal $V_{FB}$. Error amplifier 124, which is preferably a transconductance amplifier, compares $V_{FB}$ with a reference voltage 116 ($V_{REF}$) that is also connected to amplifier 124. A control signal, $V_C$, is generated in response to this comparison. The $V_C$ control signal is filtered by a capacitor 127 and coupled to the emitter of PNP transistor 118 and the base of NPN transistor 126. The $V_C$ signal controls transistor 126. When the value of $V_C$ is large enough to turn transistor 126 ON, current flows through resistor 128 and a voltage, $V_{TH}$, is developed. Generally speaking, the value of $V_{TH}$ is dependent on $V_C$. As $V_C$ increases, so does $V_{TH}$ and vice versa.

The value of $V_{TH}$ establishes the threshold point at which current comparator 122 trips. Therefore, as $V_{TH}$ increases, the current threshold of switch 108 also increases to maintain a substantially constant output voltage. However, as mentioned above, current-mode voltage regulators can become unstable when the duty cycle exceeds 50%. To prevent this instability, a duty cycle proportional slope compensation signal may be subtracted from the feedback signal ($V_{TH}$) to increase the rate of current rise perceived by control circuit 130. This is accomplished in FIG. 1 by applying the ramp signal from switch timing circuit 112 to a node between the emitter of transistor 126 and a resistor 125 (through a circuit generally depicted as variable current source 113). As the ramp signal progresses toward its peak, the voltage at the emitter of transistor 126 rises, impeding the flow of current, which causes the $V_{TH}$ voltage to decrease. Current comparator 122 interprets this as an increase in the rate of current rise in inductor 104. This causes the perceived rate of current rise in inductor 104 to be greater than the rate of current fall, which allows regulator 100 to operate at duty cycles greater than 50% without becoming unstable.

To prevent damage to switch 108, the maximum operating current of regulator 100 is limited to a certain level by placing a voltage clamp on the $V_C$ signal. Such a voltage clamp is typically implemented as shown in FIG. 1 using a PNP transistor 118 and a fixed voltage source 120. As long as the value of $V_C$ remains within a permissible operating range, voltage source 120 keeps the emitter-base junction of transistor 118 reverse-biased so that it acts as an open circuit. However, when $V_C$ attempts to rise above a preset maximum value, transistor 118 turns ON and starts to conduct. This diverts excess current away from the $V_C$ signal so that its voltage always remains at or below the preset maximum.

One undesirable consequence of slope compensation is that the true maximum current that can pass through switch 108 decreases proportionally as the duty cycle increases. This is because as the duty cycle increases, the effective magnitude of the slope compensation signal ($I_{SC}$) also increases, causing a significant drop in $V_{TH}$ during the latter ON portion of the duty cycle. This phenomena is of concern to circuit designers because it prevents the full current supplying capabilities of regulator 100 from being utilized at higher duty cycles.

A graphical illustration of this deficiency is generally shown in FIG. 2. In FIG. 2, the magnitude of the slope compensation signal $I_{SC}$, represented by line 170, increases with duty cycle, whereas the threshold level of the voltage clamp, represented by line 180, remains constant. As can be seen, because the clamp threshold remains constant, the slope compensation signal reduces the current limit by about 30%, thus allowing only approximately 70% of the intended maximum current to pass through switch 108 when the duty cycle is at about 90%.

Although FIG. 2 shows the reduction in switch current beginning at a duty cycle of about 50%, it will be understood that the switch current will start to decrease at whatever duty cycle a slope compensation signal is added. For example, some current mode switching regulators may begin to use slope compensation at duty cycles of about 10% (or less). In this case, the current sourcing capability of the regulator will begin to drop off at duty cycles of about 10%.

One way to correct this problem is to let $V_C$ rise above the maximum level imposed by the voltage clamp when slope compensation is used. This allows $V_{TH}$ to remain substantially constant rather than decrease as the amount of slope compensation increases. Merely increasing the clamp voltage directly (e.g., by increasing the value of voltage source 120) is not a viable solution because the large time constant of capacitor 127 will not allow $V_C$ to respond to a changing clamp threshold fast enough. Moreover, simply adding voltage directly to $V_C$ nulls the effect of slope compensation. What is needed is a control circuit that can adjust the $V_C$ clamp threshold with respect to the slope compensation signal so that a substantially constant maximum current limit can be maintained at greater duty cycles.

It would therefore be desirable to provide a current-mode switching voltage regulator that has improved current supplying capabilities when slope compensation is used.

It would also be desirable to provide a control circuit for a current-mode switching voltage regulator that can adjust its switching threshold with respect to the magnitude of a slope compensation signal so that a substantially constant maximum current limit of the regulator may be maintained at greater duty cycles.

It would be further desirable to provide a control circuit for a current-mode switching voltage regulator that has a clamp circuit whose threshold can be adjusted with respect to the magnitude of a slope compensation signal so that a substantially constant current limit may be maintained at greater duty cycles.

SUMMARY OF THE INVENTION

It is therefore an object of the present invention to provide a current-mode switching voltage regulator that has improved current supplying capabilities when slope compensation is used.

It is another an object of the present invention to provide a control circuit for a current-mode switching voltage regulator that can adjust its switching threshold with respect to the magnitude of a slope compensation signal so that a substantially constant maximum current limit of the regulator can be maintained at greater duty cycles.

It is a further an object of the present invention to provide a control circuit for a current-mode switching voltage regulator that has a clamp circuit whose threshold is adjusted with respect to the magnitude of a slope compensation signal so that a substantially constant maximum current limit may be maintained at greater duty cycles.

These and other objects of the present invention are accomplished by providing a current-mode switching voltage regulator that can maintain a substantially constant maximum current limit over a virtually full range of duty cycles. The voltage regulator includes a control circuit that has a buffer circuit, an adjustable voltage clamp circuit, and a slope compensation circuit. The buffer circuit isolates a control signal from capacitive loading associated with control circuit. The threshold level of the adjustable voltage clamp circuit varies with respect to the amount of slope compensation provided to the voltage regulator. This allows a control voltage to increase as slope compensation increases so that the regulator can maintain a substantially constant maximum current limit at increased duty cycles.

BRIEF DESCRIPTION OF THE DRAWINGS

The above and other objects and advantages of the present invention will be apparent upon consideration of the following detailed description, taken in conjunction with the accompanying drawings, in which like reference characters refer to like parts throughout, and in which.

DETAILED DESCRIPTION OF THE INVENTION

Figure 3:
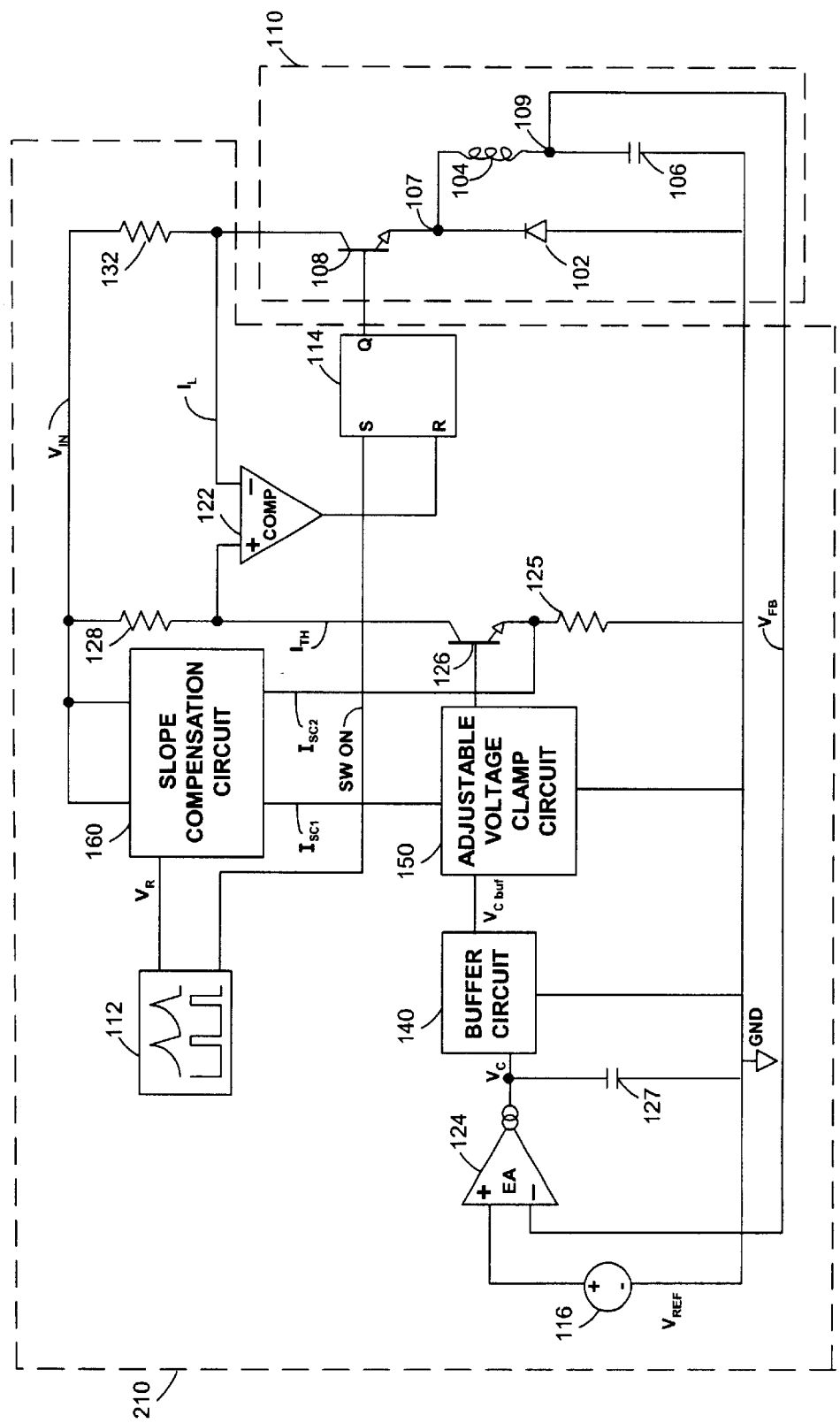
FIG. 3 is a generalized schematic diagram of a current-mode switching voltage regulator constructed in accordance with principles of the present invention.

A current-mode switching regulator 200, which is constructed in accordance with the principles of the present invention, is shown in FIG. 3. As in FIG. 1, the regulator of FIG. 3 includes output circuit 110, switch timing circuit 112, latch 114, reference voltage 116, comparator 122, error amplifier 124, resistors 125, 128, 132, transistor 126, and capacitor 127.

Figure 1:
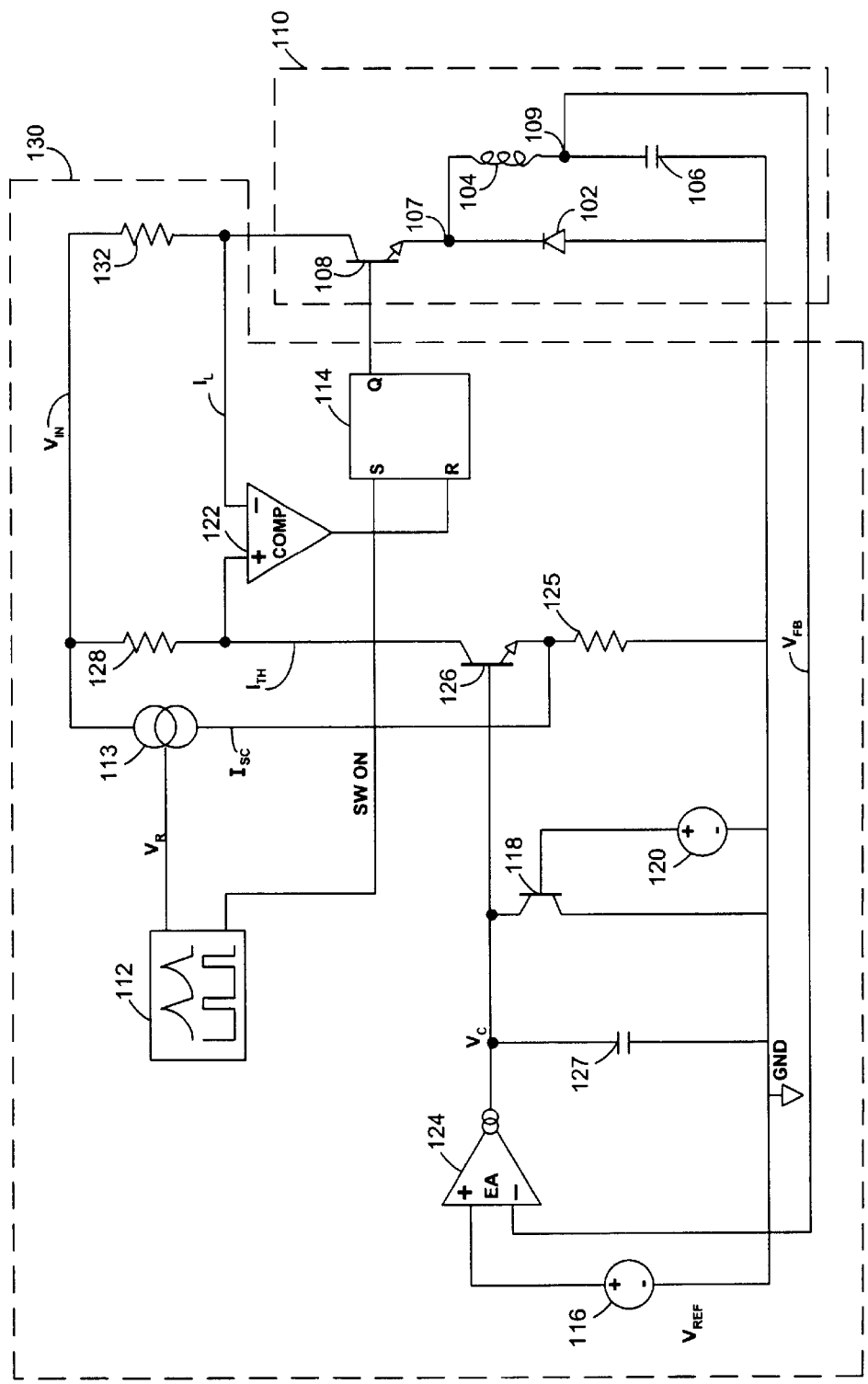
FIG. 1 is a schematic diagram of a prior art current-mode switching voltage regulator using slope compensation.
Figure 2:
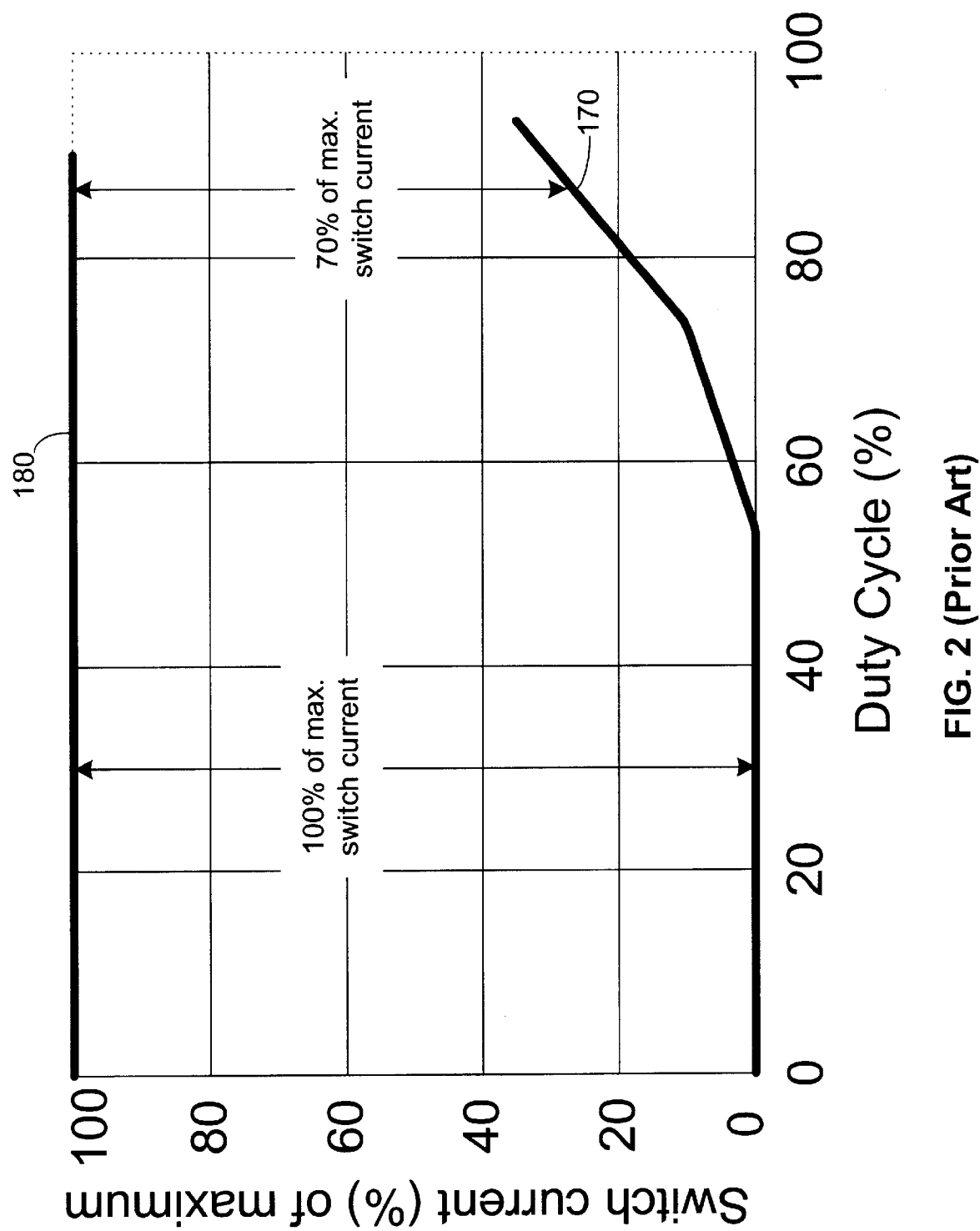
FIG. 2 is a graphical illustration of the reduction in switch current experienced by the voltage regulator of FIG. 1 when the duty cycle exceeds about 50%.

Regulator 200 has been improved as compared to the regulator of FIG. 1, however, by the addition of buffer circuit 140, adjustable voltage clamp circuit 150, and slope compensation circuit 160. As FIG. 3 shows, the output of error amplifier 124 (control signal $V_C$) is coupled to buffer circuit 140 which produces a buffered control signal ($V_{Cbuf}$) substantially proportional to $V_C$. Adding such a buffer circuit to the control loop is desirable because the buffered control signal is now substantially isolated from capacitor 127. In this configuration, $V_{Cbuf}$ is not burdened by the relatively large time constant of capacitor 127, and may quickly respond to a changing threshold level in voltage clamp 150.

Another improvement disclosed in FIG. 3 is a clamp circuit 150 whose turn-ON threshold varies with respect to a magnitude of the slope compensation signal. As FIG. 3 shows, both control signal $V_{Cbuf}$ and slope compensation circuit 160 are coupled to clamp circuit 150. During operation, slope compensation circuit 160 may produce two proportional slope compensation signals when the duty cycle exceeds a preset value. This value could vary anywhere from about 1% to about 50% depending upon the desired specific implementation. As is well known in the art, however, slope compensation must be added to current mode regulators at duty cycles of 50% or greater for a regulator to remain stable. In practice, to provide a safety margin, slope compensation is usually added at a duty cycle somewhat below 50% to ensure regulator stability.

As shown in FIG. 3, one of the slope compensation signals ($I_{SC2}$) is applied to the emitter of transistor 126 to provide stability while the other ($I_{SC1}$) is applied to adjustable voltage clamp 150. Generally speaking, the turn-ON threshold of clamp circuit 150 varies with respect to $I_{SC1}$. As $I_{SC1}$ increases, so does the turn-ON threshold and vice-versa.

When the duty cycle of regulator 200 exceeds a preset value, slope compensation circuit 160 starts to generate slope compensation signals. As the duty cycle increases, the magnitude of the two slope compensation signals increases accordingly. The turn-ON threshold of clamp circuit 150 will rise or fall in response to an increasing or decreasing value of $I_{SC1}$. When the duty cycle of regulator 200 falls below a preset value, however, the turn-ON threshold of clamp circuit 150 reaches a predetermined minimum value and remains there to prevent damage to switching element 108. Thus, when operating at duty cycles below a preset value, clamp circuit 150 acts as a fixed threshold voltage clamp and slope compensation circuit 160 has no affect on the operation of regulator 200.

The purpose of adjustable voltage clamp 150 is to permit control signal $V_{Cbuf}$ to rise above the predetermined minimum turn-ON threshold when the duty cycle increases above a preset value. This allows control circuit 210 to "compensate" for the lower current thresholds that would normally result from the use of slope compensation signal $I_{SC2}$. For example, when the duty cycle of switch 108 increases above a preset value (e.g., about 50%), the rising magnitude of $I_{SC2}$ tends to increasingly impede the flow of current through transistor 126 by raising its emitter voltage. This causes the value of $V_{TH}$ (generated by a current passing through resistor 128) to become increasingly smaller, effectively reducing the switching threshold of comparator 122 so that the amount of current that output circuit 110 can provide decreases. As $I_{SC2}$ rises, however, the turn-ON threshold of voltage clamp 150 also rises correspondingly. This allows $V_{Cbuf}$ to rise, which may increase the voltage at the base of transistor 126, forcing it to turn ON harder. From an evaluative standpoint, this means that the permissible maximum value of $V_{Cbuf}$ increases with respect to $I_{SC2}$. In one instance of the invention, the voltage increase at the emitter of transistor 126 may be substantially "canceled-out" by an equivalent (or proportional) voltage increase at the base of transistor 126. Thus, the voltage reduction in $V_{TH}$ caused by slope compensation signal $I_{SC2}$ may be substantially offset by the corresponding rise of $V_{Cbuf}$. The net result permits regulator 200 to operate over a virtually full range of duty cycles (i.e., from 1% to about 95%) and still maintain a substantially constant maximum output current limit.

It will be understood from the foregoing that allowing the base voltage of transistor 126 to increase above the minimum turn-ON threshold established by clamp circuit 150 will not harm switching element 108. This is because the effective maximum current level is still substantially maintained by voltage clamp 150. For example, assume the transconductance from $V_{Cbuf}$ to switch 108 is 1A/volt, and the turn-ON threshold of clamp 150 is 1 volt. This means the maximum permissible switch current is set at a 1A limit. If slope compensation raises the emitter voltage of transistor 126 by 0.3 volts, the increasing clamp threshold may also allow the base voltage to rise by 0.3 volts. Although the clamp turn-ON threshold is now 1.3 volts, the effective base voltage of transistor 126 with respect to its emitter is still 1 volt, which restricts the switch current to the desired 1A limit.

Figure 5:
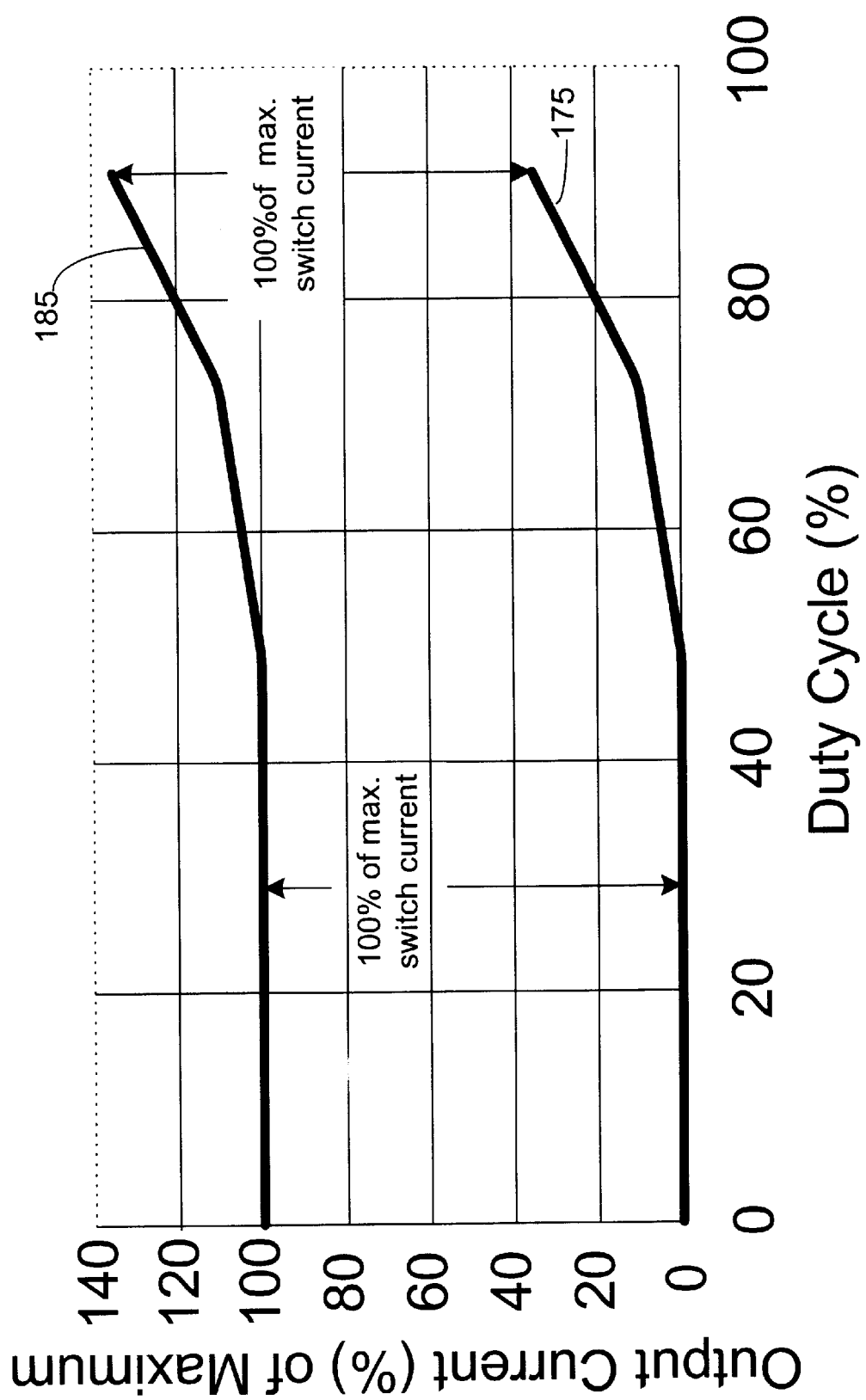
FIG. 5 is a graphical illustration of the improved current response provided by the voltage regulator of FIG. 3 when the duty cycle exceeds about 50%.

A graphical illustration of this is generally shown in FIG. 5 wherein the magnitude of the slope compensation signal $I_{SC2}$, represented by line 175, increases with duty cycle. The threshold level of voltage clamp 150, represented by line 185, is allowed to increase correspondingly. Although the clamp turn-ON threshold appears to be about 30% above the desired maximum (i.e., about 130%) the actual current limit of switch 108 is represented by the difference between line 185 (about 130%) and line 175 (about 30%). Consequently, the resulting maximum current limit is maintained at the desired value.

Figure 4:
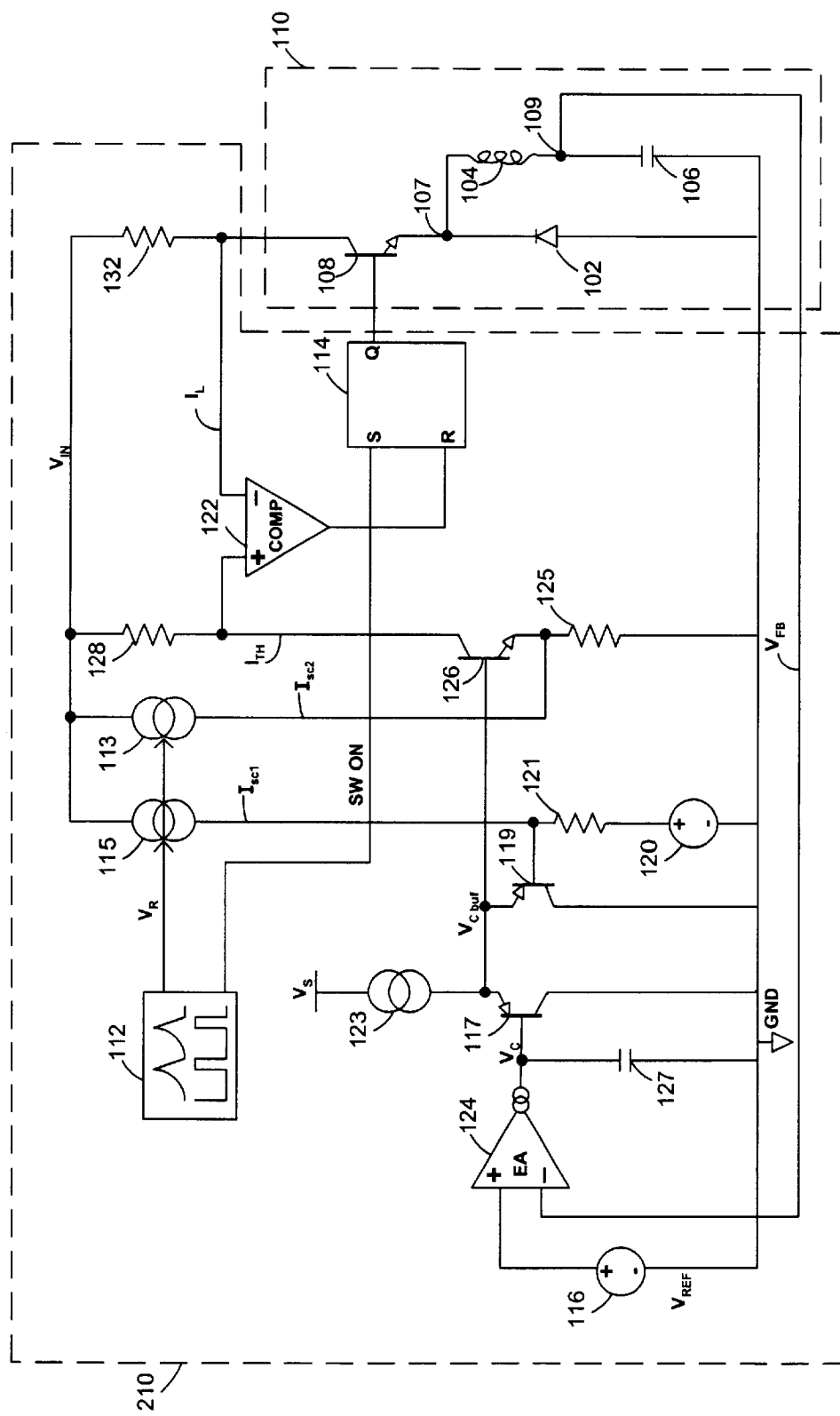
FIG. 4 is a schematic diagram of a current-mode switching voltage regulator constructed in accordance with principles of the present invention.

A more specific implementation of regulator 200 is shown in FIG. 4. In FIG. 4, buffer circuit 140 includes PNP transistor 117 and current source 123. Voltage clamp circuit 150 includes PNP transistor 119, fixed voltage source 120, and resistor 121. Slope compensation circuit 160 includes current sources 113 and 115. The output of error amplifier 124 (i.e., control voltage $V_C$) is coupled to the base of transistor 117. Transistor 117 acts as a buffer and produces buffered control signal $V_{Cbuf}$ at its emitter terminal. Transistor 117 substantially isolates $V_{Cbuf}$ from the capacitive loading associated with the output of error amplifier 124. Current source 123 provides bias current to transistor 117.

The $V_{Cbuf}$ signal is coupled to voltage clamp 150 via the emitter of transistor 119. Slope compensation signal $I_{SC1}$ is coupled to the base of transistor 119. Series coupled resistor 121 and voltage source 120 are also coupled to the base of transistor 119. The purpose of fixed voltage source 120 is the same as it was in regulator 100, i.e., to establish a point at which the voltage clamp turns ON. Using this arrangement, however, the clamp threshold will vary with respect to the slope compensation signal $I_{SC1}$. For example, as $I_{SC1}$ progresses toward its peak, the current through resistor 121 will rise increasing the voltage at the base of transistor 119, which, in turn, increases the clamp threshold. On the other hand, as $I_{SC1}$ approaches its minimum, the current through resistor 121 falls off and the voltage at which clamp 150 will turn ON decreases. A minimum clamp threshold is guaranteed by fixed voltage source 120. Thus, as the duty cycle increases above the preset value, the clamp. circuit allows $V_{Cbuf}$ to rise to a voltage level above that established by fixed voltage source 120.

In this manner, control circuit 210 compensates for the slope compensation signal ($I_{SC2}$) that is produced during the latter ON portion of the duty cycle. For example, when the duty cycle of switch 108 rises above a preset value, the rising magnitude of $I_{SC2}$ causes the value of $V_{TH}$ to become increasingly smaller forcing the amount of current through switch 108 to decrease. As $I_{SC2}$ rises, however, the base voltage of transistor 119 rises correspondingly, increasing the turn-ON threshold of the voltage clamp. As a result, the reduction in $I_{TH}$ caused by slope compensation may be substantially "canceled-out" by the rising value of $V_{Cbuf}$.

Figure 6:
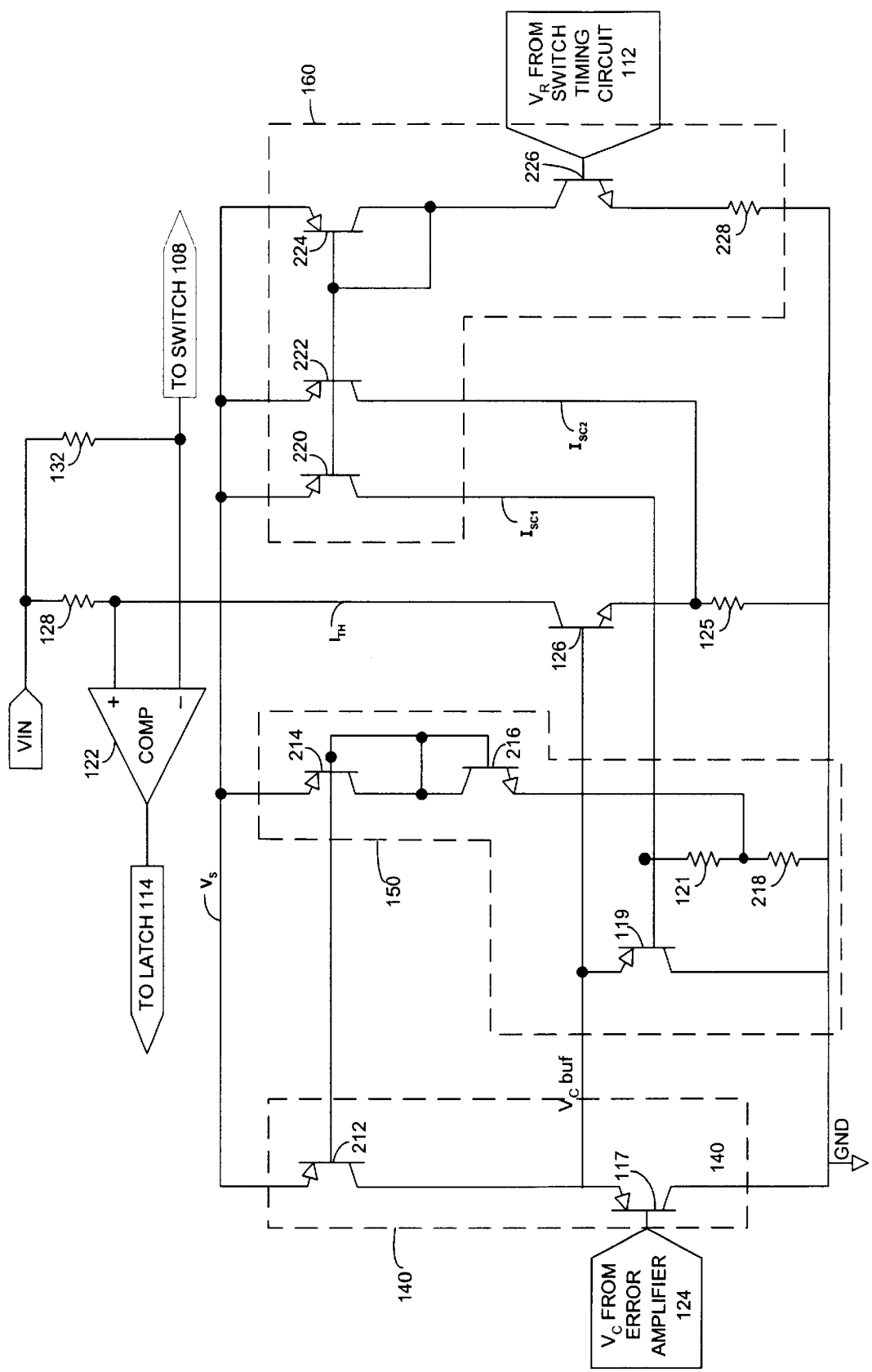
FIG. 6 is a schematic diagram illustrating one possible specific embodiment of the buffer circuit, adjustable voltage clamp circuit, and slope compensation circuit employed in the present invention.

FIG. 6 illustrates one possible specific implementation of buffer circuit 140, adjustable voltage clamp circuit 150, and slope compensation circuit 160 within control circuit 210. In FIG. 6, buffer circuit 140 includes transistors 117 and 212. PNP transistor 117 acts as a buffer, receiving control signal $V_C$ from error amplifier 124 and converting it to buffered control signal $V_{Cbuf}$. PNP transistor 212 functions as a current source and biases transistor 117 in a manner similar to that of the generalized bias circuit shown in FIG. 4 (formed by current source 123 and rail voltage $V_S$). Transistor 212 receives base current from the base of diode-connected PNP transistor 214. Transistor 214 has its emitter connected to rail voltage $V_S$ and is therefore always ON provided a sufficient voltage is present at $V_S$. Transistor 214 will therefore also always be ON when there is sufficient rail voltage.

As shown in FIG. 6, the common base-collector terminal of diode-connected NPN transistor 216 is coupled to transistor 214 and its emitter is connected to a node between resistors 121 and 218. Transistors 214 and 216 act as level shifting diodes, supplying a substantially constant voltage to resistor 218 and thus forming a constant voltage source similar to the generalized voltage source 120 (shown in FIGS. 1 and 4). In this particular implementation, the clamp threshold is set at approximately two diode drops below the rail voltage, although other clamp levels can be implemented if desired.

The slope compensation waveform $V_R$ (which may be, for example, a sawtooth waveform) from switch timing circuit 112 is applied to the base of NPN transistor 226 and transformed into a current across resistor 228. This current is mirrored by diode-connected PNP transistor 224 to the common base of PNP transistors 220 and 222, producing slope compensation signals $I_{SC1}$ and $I_{SC2}$. Transistor 222 provides slope compensation signal $I_{SC2}$ by sourcing a current to resistor 125, which raises the emitter voltage of transistor 126 and thereby reduces the current flowing through resistor 128. This decreases $I_{TH}$, which lowers the switch OFF threshold of current comparator 122. Transistor 220 may source an identical or proportional current (i.e., $I_{SC1}$) to resistor 121, increasing the base voltage of transistor 119 an amount substantially equal to the decrease in $V_{TH}$.

While the principles of the present invention have been illustrated using buck, step-down switching regulators, persons skilled in the art will appreciate that the principles may be equally applied to other switching regulator topologies, including for example, boost, step-up switching regulators and buck-boost switching regulators. Thus, persons skilled in the art will appreciate that the principles of the present invention can be practiced by other than the described embodiments, which are presented for purposes of illustration and not of limitation, and the present invention is limited only by the claims which follow.

What is claimed is:

1. A method for maintaining a maximum output current limit of a current-mode switching regulator; the method comprising:

generating a slope compensation signal when a duty cycle of the regulator is above a preset value; and adjusting a current limit point of the regulator as a function of the slope compensation signal to maintain the maximum output current limit of the regulator substantially constant.

2. The method of claim 1 wherein the adjusting further comprises varying a maximum allowable value of a control signal with respect to the slope compensation signal.

3. The method of claim 2 wherein the adjusting further comprises increasing the maximum allowable control signal value as a magnitude of the slope compensation signal increases.

4. The method of claim 2 wherein the adjusting further comprises decreasing the maximum allowable control signal value as a magnitude of the slope compensation signal decreases.

5. The method of claim 4 wherein the adjusting further comprises maintaining the maximum allowable control signal value at a predetermined minimum when the magnitude of the slope compensation signal decreases below a preset value.

6. The method of claim 1 wherein the adjusting further comprises varying a threshold of a voltage clamp circuit with respect to said slope compensation signal.

7. The method of claim 6 wherein the adjusting further comprises increasing the clamp threshold as a magnitude of the slope compensation signal increases.

8. The method of claim 6 wherein the adjusting further comprises decreasing the clamp threshold as a magnitude of the slope compensation signal decreases.

9. The method of claim 8 wherein the adjusting further comprises maintaining the clamp threshold at a predetermined minimum when the magnitude of the slope compensation signal decreases below a preset minimum value.

10. The method of claim 1 wherein said preset value is characterized by a value between about 1% and about 50%.

11. The method of claim 10 wherein the adjusting further comprises producing an error amplifier output signal that is indicative of the difference between a feedback signal and a reference voltage.

12. The method of claim 11 wherein the adjusting further comprises producing a control signal from the error amplifier output signal by substantially isolating the error amplifier output signal from the effects of capacitive loading associated with the error amplifier output signal.

13. The method of claim 12 wherein the adjusting further comprises varying a maximum allowable value of the control signal with respect to the slope compensation signal.

14. The method of claim 1 wherein the generating further comprises creating the slope compensation signal with a switch timing circuit.

15. A method for maintaining a maximum output current limit of a current-mode switching regulator; the method comprising:

generating a first slope compensation signal when a duty cycle of the regulator is above a preset value;

generating a second slope compensation signal when the duty cycle of the regulator is above the preset value; and adjusting a current limit point of the regulator as a function of said second slope compensation signal to maintain the current limit substantially constant.

16. The method of claim 15 wherein the first slope compensation signal is generated such that the first slope compensation signal is substantially proportional to the second slope compensation signal.

17. The method of claim 15 wherein the second slope compensation signal establishes a current threshold point at which a switch circuit switches so that the switching regulator remains stable when the duty cycle is at or above a preset value.

18. The method of claim 15 wherein the first slope compensation signal varies a maximum allowable current threshold of the regulator so that the current supplying capability of the regulator remains substantially constant.

19. The method of claim 18 wherein the adjusting further comprises increasing the maximum allowable current threshold of the regulator as a magnitude of the second slope compensation signal increases.

20. The method of claim 18 wherein the adjusting further comprises decreasing the maximum allowable current threshold of the regulator as a magnitude of the second slope compensation signal decreases.

21. The method of claim 20 wherein the adjusting further comprises maintaining the maximum allowable current threshold of the regulator at a predetermined minimum when the magnitude of the second slope compensation signal decreases below a preset value.

22. A switching regulator circuit that maintains a substantially constant maximum output current limit and provides a regulated voltage to a load, the switching regulator having an output circuit that includes a switch circuit coupled to a power source and an output terminal, the output circuit providing a feedback signal that is indicative of the regulated voltage, the switching regulator comprising:

a control circuit coupled to said output circuit that receives said feedback signal, said control circuit providing a first control signal to said output circuit in response to said feedback signal that controls a turn-off threshold of said switch circuit, said control circuit comprising:
(a) a switch timing circuit that generates a ramp signal;
(b) a slope compensation circuit coupled to said switch timing circuit that generates a first slope compensation signal in response to said ramp signal; and
(c) a voltage clamp circuit that receives said first slope compensation signal, said voltage clamp circuit having a clamp threshold that varies with respect to said first slope compensation signal.

23. The switching regulator circuit of claim 22 wherein said slope compensation circuit generates said first slope compensation signal when a duty cycle of said switch circuit is at or above a preset value.

24. The switching regulator circuit of claim 22 wherein said slope compensation circuit generates a second slope compensation signal substantially proportional to said first slope compensation signal.

25. The switching regulator circuit of claim 24 wherein said second slope compensation signal is coupled to establish a threshold point at which the switch circuit switches so that the regulator remains stable when said duty cycle is above a preset value.

26. The switching regulator circuit of claim 25 wherein said first slope compensation signal is coupled to vary a maximum allowable current threshold of the regulator so that the current supplying capability of the regulator remains substantially constant.

27. The switching regulator circuit of claim 25 wherein said switch timing circuit includes an oscillator circuit.

28. The switching regulator circuit of claim 25 wherein said control circuit further comprises:
a comparator circuit having a first input, a second input, and an output, said first input coupled to a signal that is indicative of a current passing through the switch circuit; and
a transistor having a base coupled to said voltage clamp circuit and an emitter coupled to said second slope compensation signal.

29. The switching regulator circuit of claim 28 wherein said second input of said comparator circuit is coupled to a collector of said transistor.

30. The switching regulator circuit of claim 25 wherein said slope compensation circuit comprises:
a first transistor coupled to said switch timing circuit that receives said ramp signal;
a diode-connected transistor coupled to said first transistor; and
a current mirror circuit coupled between said first transistor and said diode-connected transistor.

31. The switching regulator circuit of claim 30 wherein said current mirror circuit comprises:
a second transistor; and
a third transistor, said second and third transistors having common base, and wherein said second transistor generates said second slope compensation signal substantially proportional to said ramp signal and wherein said third transistor generates said first slope compensation signal substantially proportional to said ramp signal.

32. The switching regulator circuit of claim 22 wherein said voltage clamp circuit comprises:
a circuit that provides a fixed voltage potential;
a first transistor having a base coupled to said first slope compensation signal; and
a first resistor having first and second terminals; said first terminal coupled to said base and said first slope compensation signal, and said second terminal coupled to said fixed voltage potential.

33. The switching regulator circuit of claim 32 wherein said fixed voltage potential circuit comprises:
first and second diode-connected transistors coupled in series; and
a second resistor having first and second terminals, said first terminal coupled to the second terminal of said first resistor and to said second diode-connected transistor, and said second terminal coupled to ground.

34. The switching regulator circuit of claim 22 wherein said control circuit further comprises:
an error amplifier circuit coupled to said feedback signal and to a reference voltage that produces an output signal indicative of the difference between said feedback voltage and said reference voltage; and
a buffer circuit coupled to said error amplifier that receives said output signal and produces a second control signal in response to said output signal, said buffer circuit substantially isolating said second control signal from the effects of capacitive loading associated with said output signal.

35. The switching regulator circuit of claim 34 wherein said buffer circuit comprises at least one transistor.

* * * * *